United States Patent
Son et al.

(10) Patent No.: US 11,149,626 B2
(45) Date of Patent: Oct. 19, 2021

(54) METHOD OF COOLING HIGH TEMPERATURE VEHICLE COOLANT

(71) Applicant: Hyundai Kefico Corporation, Gunpo-si (KR)

(72) Inventors: Se Hoon Son, Yongin-si (KR); Nam Hoon Kim, Suwon-si (KR); Tae Hyun An, Uijeongbu-si (KR); John Ha Lee, Suwon-si (KR); Seo Yeon Cho, Hanam-si (KR)

(73) Assignee: Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 17/115,552

(22) Filed: Dec. 8, 2020

(65) Prior Publication Data

US 2021/0180504 A1 Jun. 17, 2021

(30) Foreign Application Priority Data

Dec. 13, 2019 (KR) .......................... 10-2019-0166387

(51) Int. Cl.
*B60W 10/11* (2012.01)
*F01P 5/04* (2006.01)
(Continued)

(52) U.S. Cl.
CPC ................ *F01P 5/04* (2013.01); *B60K 17/06* (2013.01); *B60W 10/06* (2013.01); *B60W 10/105* (2013.01); *B60W 10/11* (2013.01); *B60W 10/30* (2013.01); *B60W 30/1884* (2013.01); *F01P 5/06* (2013.01); *F02B 67/06* (2013.01);
(Continued)

(58) Field of Classification Search
CPC ......... B60W 2510/0676; B60W 10/06; B60W 10/101; B60W 10/11; B60W 10/30; B60W 30/1884; B60W 251/1005; B60W 2510/30; B60W 2710/0644; B60W 2710/1005; B60W 2710/30; F01P 5/04; F02B 67/06
See application file for complete search history.

(56) References Cited

U.S. PATENT DOCUMENTS

2014/0214289 A1* 7/2014 Ott ........................ B60W 10/10
701/54

FOREIGN PATENT DOCUMENTS

JP          20040340082 A    12/2004
KR       10-1997-004476 A     7/1997
(Continued)

*Primary Examiner* — Roger L Pang
(74) *Attorney, Agent, or Firm* — Morgan, Lewis & Bockius LLP (57) ABSTRACT

A method of rapidly cooling a high temperature vehicle coolant is disclosed. The method includes determining a coolant temperature lowering entry condition by detecting information on the coolant temperature, an engine speed, and a gear state and determining whether the coolant temperature needs to be rapidly lowered on the basis of the detected information; and changing a number of gear stages by adjusting the number of gear stages of a transmission to be reduced to a specific number of gear stages when the coolant temperature needs to be rapidly lowered in the determining of the coolant temperature lowering entry condition, so that the cooling fan is driven by driving the fan belt through a crank damper pulley using the increased engine speed according to the reducing adjustment of the number of gear stages.

12 Claims, 7 Drawing Sheets

(51) Int. Cl.
  *B60K 17/06* (2006.01)
  *B60W 10/06* (2006.01)
  *B60W 10/30* (2006.01)
  *B60W 30/188* (2012.01)
  *F01P 5/06* (2006.01)
  *F02B 67/06* (2006.01)
  *B60W 10/105* (2012.01)
  *F01P 5/10* (2006.01)
  *F16H 3/72* (2006.01)

(52) U.S. Cl.
  CPC ............... *B60W 2510/0638* (2013.01); *B60W 2510/0676* (2013.01); *B60W 2510/1005* (2013.01); *B60W 2510/30* (2013.01); *B60W 2710/0644* (2013.01); *B60W 2710/1005* (2013.01); *B60W 2710/30* (2013.01); *F01P 5/10* (2013.01); *F01P 2025/08* (2013.01); *F01P 2025/64* (2013.01); *F16H 3/724* (2013.01)

(56) References Cited

FOREIGN PATENT DOCUMENTS

| | | |
|---|---|---|
| KR | 10-1997-0044476 A | 7/1997 |
| KR | 20215862 B1 | 12/2000 |
| KR | 100405486 B1 | 11/2003 |
| KR | 2005-0000072 A | 3/2005 |
| KR | 101008715 B1 | 10/2011 |
| KR | 101241191 B1 | 4/2013 |
| KR | 10-2020-0135623 A | 12/2020 |
| WO | WO 0106152 A1 | 1/2001 |
| WO | WO-2019188415 A1 * | 10/2019 ............. F02D 45/00 |

\* cited by examiner

FIG. 9

METHOD OF COOLING HIGH TEMPERATURE VEHICLE COOLANT

CROSS REFERENCE TO RELATED APPLICATIONS

The present application claims priority to Korean Patent Application No. 10-2019-0166387 filed Dec. 13, 2019, the entire contents of which is incorporated herein for all purposes by this reference.

BACKGROUND OF THE INVENTION

Field of the Invention

The present disclosure relates to a method of cooling a high temperature vehicle coolant and, more particularly, to a method of rapidly cooling a coolant when a coolant temperature of a vehicle in which a cooling fan is driven using a fan belt exceeds a predetermined temperature value.

Description of the Related Art

Figure 1:
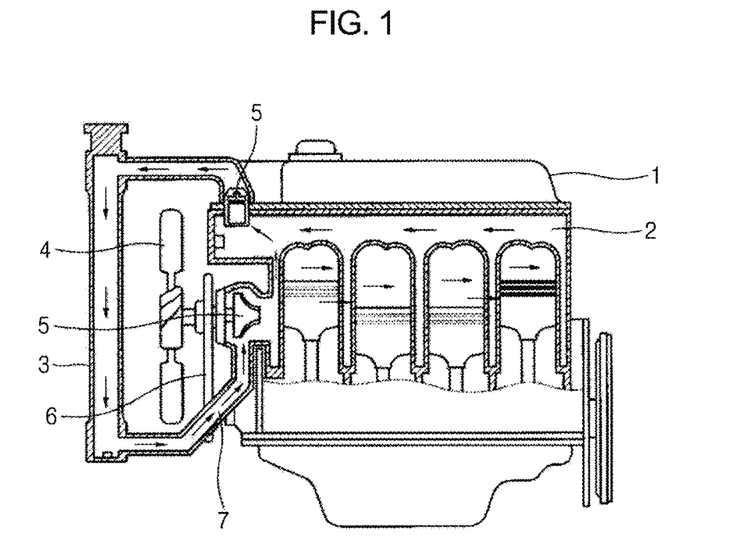
FIG. 1 is a schematic diagram showing a cooling fan mounted on a vehicle and a flow of a cooling fluid according to the related art.

In general, an engine of an automobile enters into a state of high temperature and high pressure due to pressure and heat caused by combustion of fuel. In order to cool such an engine in high-temperature and high-pressure state, as shown in FIG. 1, a coolant passage 2 is formed in the cylinder block and the cylinder head of the engine 1, and a radiator 3 for dissipating the heat of the coolant circulating through the coolant passage 2 is formed in front of the engine 1.

In addition, a cooling fan 4 is formed on one side of the radiator 3 to force the air to be blown into the radiator so that the coolant passing through the radiator 3 may be cooled.

In order to sufficiently obtain the cooling effect of the radiator 3 as described above, the cooling fan 4 that forces the air to be blown is rotated integrally with the water pump 5 of the engine 1 by receiving the driving force of the engine 1. The amount of air blown by the cooling fan 4 varies depending on the number of blades, twist angle, fan diameter, rotation speed, etc. However, in order to maintain a certain amount of air flow, increasing the fan diameter rather than increasing the rotational speed reduces the loss of power.

As a type of the cooling fan 4, there are a viscous-coupling cooling fan that is connected to a pulley of a crankshaft using a belt 6 so that an amount of rotation varies according to the temperature of the air passing through the radiator 3, and an electric fan that drive cooling fans with an electric motor using electricity from the battery. In the longitudinal engine in which the engine is mounted along the long axis of the vehicle, the viscous-coupling cooling fan is mainly applied.

Meanwhile, when the vehicle is driving, the driving environment varies depending on the surrounding situation. In particular, in uphill driving, high-speed driving and rough driving environments, a large load is imposed upon the engine and powertrain. Herein, the coolant, which plays a cooling role, is also exposed to a high temperature condition.

When the powertrain, including the engine, is constantly exposed to a high thermal energy, several fatal effects such as thermal deformation or reduction in durability may occur. Herein, the coolant controls the temperature of the engine, and when the coolant is not maintained at an appropriate temperature through thermal circulation, a problem may occur.

The coolant exposed to high temperatures while circulating through the water jacket surrounding the engine is cooled by natural air flow or cooling fans while passing through the radiator.

In the case of a vehicle according to the related art, when the coolant is maintained at a high temperature, the cooling fan operation and the cluster display are output. However, there is a limit to a control method for cooling efficiency improvement.

Therefore, in order to overcome the limitation according to the related art, there is a need for a technology that can improve the cooling efficiency through more active control for cooling the coolant at a high temperature.

Documents of Related Art

Patent Document 1

Korean Publication No. 10-1008715 (Jan. 10, 2011)

SUMMARY OF THE INVENTION

The present disclosure has been made to solve the above problems, and it is an objective of the present disclosure to provide a method of rapidly cooling a coolant when a coolant temperature exceeds a predetermined temperature value, in a vehicle in which a cooling fan is driven using a fan belt, thereby maximizing the cooling efficiency.

According to one aspect of the present disclosure, a method of rapidly cooling a coolant when a coolant temperature of a vehicle in which a cooling fan is driven using a fan belt exceeds a predetermined temperature value includes determining a coolant temperature lowering entry condition by detecting information on the coolant temperature, an engine speed, and a gear state and determining whether the coolant temperature needs to be rapidly lowered on the basis of the detected information; and changing a number of gear stages by adjusting the number of gear stages of a transmission to be reduced to a specific number of gear stages when the coolant temperature needs to be rapidly lowered in the determining of the coolant temperature lowering entry condition, so that the cooling fan is driven by driving the fan belt through a crank damper pulley using the increased engine speed according to the reducing adjustment of the number of gear stages.

Preferably, in the determining of the coolant temperature lowering entry condition, when the detected coolant temperature is higher than a predetermined temperature, the engine speed is higher than a predetermined RPM, the gear state is set to a stage D, and the vehicle is driven in a driver pattern that meets a predetermined pattern mode switch-on condition, the coolant temperature lowering entry condition may be determined to be met.

Herein, the coolant temperature lowering entry condition determination step may be performed by detecting a vehicle outside temperature and determining that the coolant temperature lowering entry condition is met only when the vehicle outside temperature is higher than a predetermined temperature.

Preferably, the changing of the number of gear stages may include calculating a number of gear stages to be reduced from the current number of gear stages on the basis of the detected coolant temperature information and engine speed information.

Herein, the number of gear stages to be reduced in the calculating of the number of gear stages to be reduced may be selected by a predetermined number of gear stages in a map in which the coolant temperature value is set to an X axis and the engine rotation speed value is set to a Y axis.

In addition, after the changing of the number of gear stages, the method of cooling the high temperature vehicle coolant may further include restoring the number of gear stages to a state before the changing when the engine speed exceeds a predetermined critical revolutions per minute (RPM).

Preferably, the changing of the number of gear stages may include calculating a time to be maintained in a state of the number of gear stage to be reduced, on the basis of the detected coolant temperature information and information on the number of gear stages to be reduced.

Herein, the time to be maintained in the calculating of the time to be maintained may be selected by a predetermined time value in a map in which a coolant temperature value when entering coolant temperature lowering is set to an X axis and the number of gear stages to be changed is set to a Y axis.

In addition, the number of gear stages to be reduced in the calculating the number of gear stages to be reduced may be selected by a predetermined number of gear stages in a map where an outdoor temperature value is set to an X axis and an engine speed value is set to a Y axis.

Preferably, after the changing of the number of gear stages, the method may further include restoring the number of gear stages to a state before the changing, when the coolant temperature is equal to or less than a predetermined reference temperature.

Preferably, after the changing of the number of gear stages, the method may further include restoring the number of gear stages to a state before the changing, when the engine speed exceeds a predetermined critical revolutions per minute (RPM).

Preferably, an air intake amount may be changed by adjusting a pitch angle of an air intake blade according to a vehicle speed and a vehicle outside temperature.

According to another aspect of the present disclosure, an apparatus for rapidly cooling a coolant when a coolant temperature of a vehicle in which a cooling fan is driven using a fan belt exceeds a predetermined temperature value includes a vehicle information detection unit detecting coolant temperature information, engine speed information, gear state information, driver pattern mode information, and outside temperature information, and then transmits the detected state information to a coolant temperature decrease entry condition determination unit; a coolant temperature lowering entry condition determination unit determining whether or not the temperature of the coolant should be rapidly lowered on the basis of the state information detected through the vehicle information detection unit; and a gear stage number change unit adjusting the number of gear stages of the transmission to be reduced to a specific number of gear stages, so that the cooling fan is driven by driving the fan belt through the crank damper pulley using the increased engine speed according to the reducing adjustment of the number of gear stages.

Preferably, the coolant temperature lowering entry condition determination unit may determine that the coolant temperature lowering entry condition is met when the detected coolant temperature is higher than a predetermined temperature, the engine speed is higher than a predetermined RPM, the gear state is set to the stage D, and a vehicle is driven in a driver pattern that meets a predetermined pattern mode switch On condition.

Herein, the coolant temperature lowering entry condition determination unit may detect a vehicle outside temperature and determine that the coolant temperature lowering entry condition is met when the vehicle outside temperature is higher than a predetermined temperature.

In addition, the coolant temperature lowering entry condition determination unit may further include an intake blade pitch angle variable device changing an air intake amount by adjusting a pitch angle of an air intake blade according to the vehicle speed and the vehicle outside temperature.

According to an embodiment of the present disclosure, since the coolant temperature lowering entry condition determination step S110, the gear stage number changing step S120, the reduced stage number calculation step S121, the maintaining time calculation step S122, and the gear stage restoring step S130 are included, when the coolant temperature of the vehicle in which the cooling fan is driven using the fan belt exceeds the predetermined temperature value, the coolant temperature can be cooled rapidly, thereby maximizing the cooling efficiency. Accordingly, it is possible to provide a method and system for cooling a coolant, the method and system being configured to be capable of mitigating damage to the engine to secure the operability of the engine and prevent failures, such as thermal deformation, occurring at a high temperature in advance to secure an effective life.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a preferred embodiment of the present disclosure will be described in detail.

In describing the present disclosure, terms used in the following specification are only used to describe specific embodiments, and are not intended to limit the present disclosure. Singular expressions include plural expressions unless the context clearly indicates otherwise.

In addition, it is to be understood that terms such as "include" or "have" in the present specification are intended to designate the existence of features, numbers, steps, actions, components, parts, or combinations thereof described in the specification, but not to preclude the possibility of the presence or addition of one or more other features or numbers, steps, actions, components, parts, or combinations thereof.

In addition, terms such as first and second may be used to describe various components, but the components should not be limited by the terms. These terms are used only for the purpose of distinguishing one component from another component.

In addition, terms such as " . . . part", " . . . unit", and " . . . module" described in the specification mean a unit that processes at least one function or operation, and the unit may be implemented by hardware, software, or a combination of hardware and software.

In the description with reference to the accompanying drawings, the same drawing reference numerals are assigned to the same elements, and duplicate descriptions of the same elements will be omitted. In addition, in describing the present disclosure, when it is determined that a detailed description of a related known technology may unnecessarily obscure the subject matter of the present disclosure, a detailed description thereof will be omitted.

Figure 2:
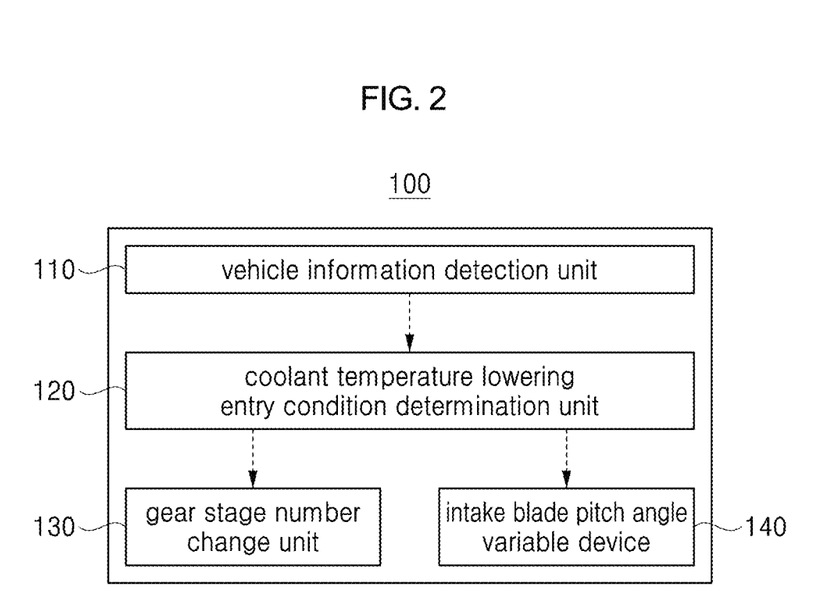
FIG. 2 is a block diagram illustrating a system for cooling a high temperature vehicle coolant according to an embodiment of the present disclosure.
Figure 3:
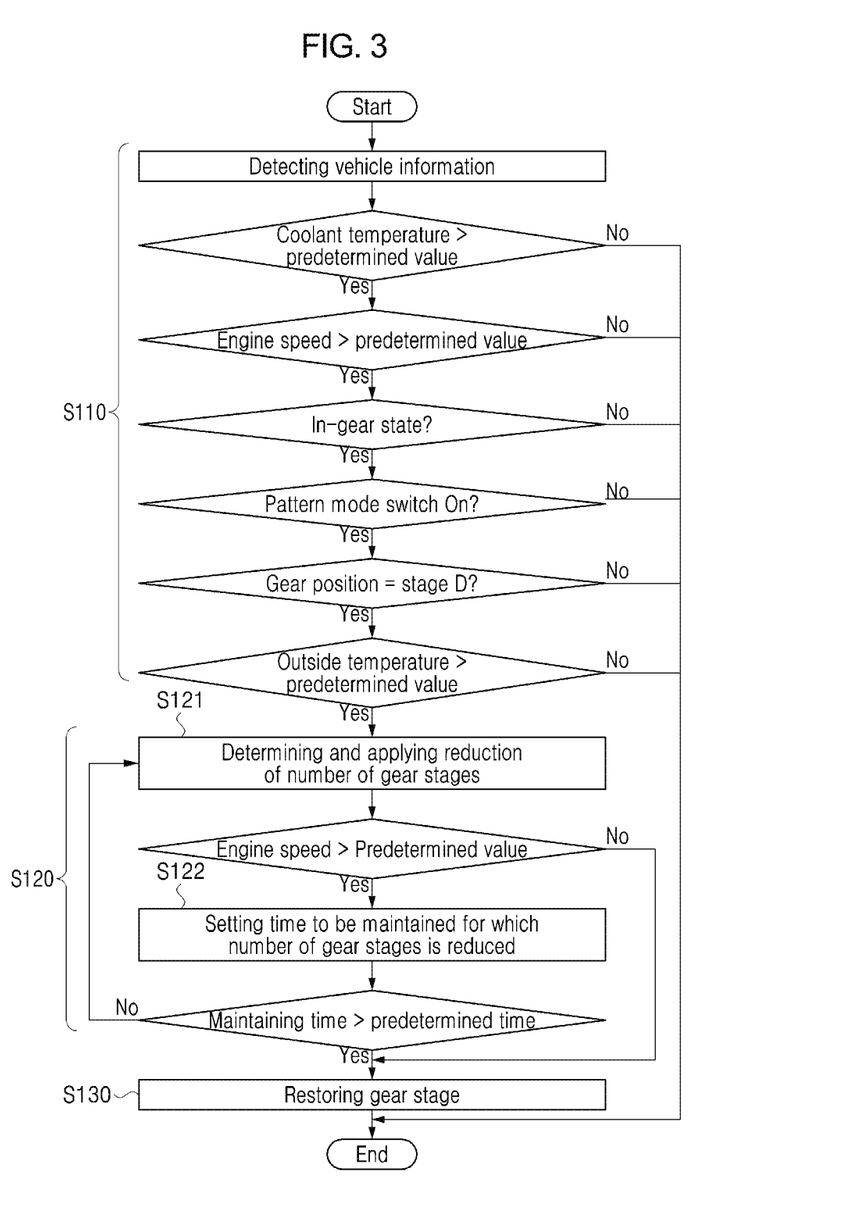
FIG. 3 is a flowchart illustrating a method of cooling a high temperature vehicle coolant according to an embodiment of the present disclosure.

FIG. 2 is a block diagram illustrating a system 100 for cooling a high temperature vehicle coolant according to an embodiment of the present disclosure; and FIG. 3 is a flowchart illustrating a method S100 of cooling a high temperature vehicle coolant according to an embodiment of the present disclosure.

Referring to these drawings, the system 100 for cooling a high temperature vehicle coolant according to the present embodiment is configured to include a vehicle information detection unit 110, a coolant temperature lowering entry condition determination unit 120, and a gear stage number change unit 130. In some cases, as shown in FIG. 2, an intake blade pitch angle variable device 140 may be further included.

Specifically, the vehicle information detection unit 110 according to the present embodiment plays a role of detecting coolant temperature information, engine speed information, and gear state information, and then transmitting the detected state information to the coolant temperature lowering entry condition determination unit 120.

The coolant temperature lowering entry condition determination unit 120 determine whether the coolant temperature needs to be rapidly lowered on the basis of the state information detected through the vehicle information detection unit 110.

Specifically, the coolant temperature lowering entry condition determination unit 120 determines that the coolant temperature lowering entry condition is met when the detected coolant temperature is higher than a predetermined temperature, the engine speed is higher than a predetermined RPM, the gear state is set to the stage D, and a vehicle is driven in a driver pattern that meets a predetermined pattern mode switch On condition.

In some cases, the coolant temperature lowering entry condition determination unit 120 may detect a vehicle outside temperature and determine that the coolant temperature lowering entry condition is met when the vehicle outside temperature is higher than a predetermined temperature.

In addition, when it is necessary to rapidly lower the temperature of the coolant in the coolant temperature lowering entry condition determination step S110, the gear stage number change unit 130 adjusts the number of gear stages of the transmission to be reduced to a specific number of gear stages, so that the cooling fan is driven by driving the fan belt through the crank damper pulley using the increased engine speed according to the reducing adjustment of the number of gear stages.

The intake blade pitch angle variable device 140 according to the present embodiment may change an air intake amount by adjusting a pitch angle of an air intake blade according to the vehicle speed and the vehicle outside temperature.

The intake blade pitch angle variable device 140 is configured to be mounted at a position where a central axis of each blade constituting the intake blade is bound to the rotor to rotate the central axis of the blade by a predetermined angle in one direction, thereby changing a pitch angle of the blade. Herein, a link structure, an actuator, and a combination of a link structure and an actuator may be adopted, as a configuration for rotating the central axis of the blade by a predetermined angle, but the structure is not limited thereto.

Hereinafter, a method S100 of rapidly cooling a vehicle coolant by using the system 100 for cooling the high temperature vehicle coolant according to the present disclosure will be described.

The method S100 of cooling a high temperature vehicle coolant according to the present embodiment includes a coolant temperature lowering entry condition determination step S110 and a gear stage number changing step S120.

Specifically, the coolant temperature lowering entry condition determination step S110 includes detecting vehicle information and determining whether the temperature of the coolant should be rapidly lowered on the basis of the detected vehicle information.

Vehicle information including current vehicle coolant temperature information, engine speed information, gear state information, driver pattern mode information, and outside temperature information is detection information used in the coolant temperature lowering entry condition determination step S110. When the detected coolant temperature is higher than a predetermined temperature, the engine speed is higher than a predetermined revolutions per minute (RPM), and the gear state is set to the stage D, it is determined that the coolant temperature lowering entry condition is met. In addition, the pattern mode to use is set, and herein, as illustrated in FIG. 3, when the pattern mode switch is in an On state, it may be determined that the coolant temperature lowering entry condition is met.

More preferably, after a vehicle outside temperature is further detected, it may be determined that the coolant temperature lowering entry condition is met only when the vehicle outside temperature is higher than a predetermined reference temperature. Meanwhile, when the vehicle outside temperature is less than a predetermined reference temperature, it is determined that the cooling effect may be exhibited only by an current operating state of a cooling system of the vehicle so that the coolant temperature lowering entry condition is not met.

Meanwhile, when it is determined to rapidly lower the temperature of the coolant in the coolant temperature lowering entry condition determination step S110, the number of gear stages of the transmission is adjusted to be reduced to a specific number of gear stages and the cooling fan may be driven by driving the fan belt through the crank damper pulley using the increased engine speed according to the reducing adjustment of the number of gear stages, in the gear stage number changing step S120.

Specifically, the gear stage number changing step S120 is configured to include a gear stage number-calculation step S121 and a maintaining time calculation step S122, as shown in FIG. 3.

Figure 4:
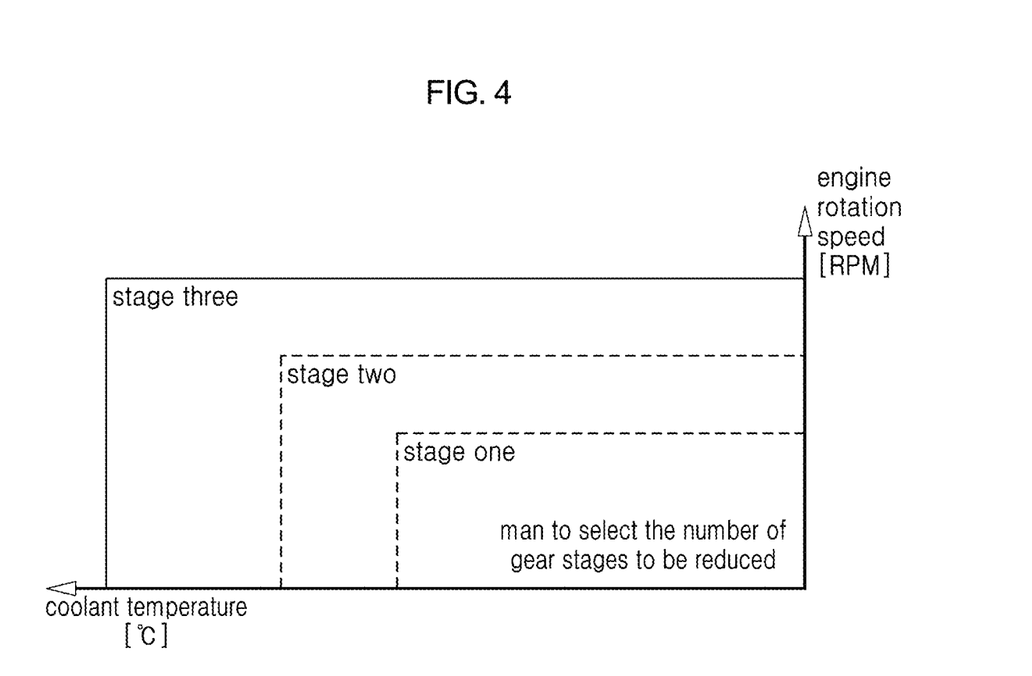
FIG. 4 is a map in which the number of gear stages to be reduced may be calculated in a gear stage number-calculation step, in which a coolant temperature value is set to an X axis and an engine rotation speed value is set to a Y axis.

In the gear stage number-calculation step S121, the number of gear stages to be reduced from the current number of gear stages is calculated on the basis of the detected coolant temperature information and engine speed information. Herein, the number of gear stages to be reduced in the gear stage number-calculation step S121 may be selected by a predetermined number of gear stages in a map in which a coolant temperature value is set to an X axis and an engine speed value is set to a Y axis, as shown in FIG. 4.

Figure 6:
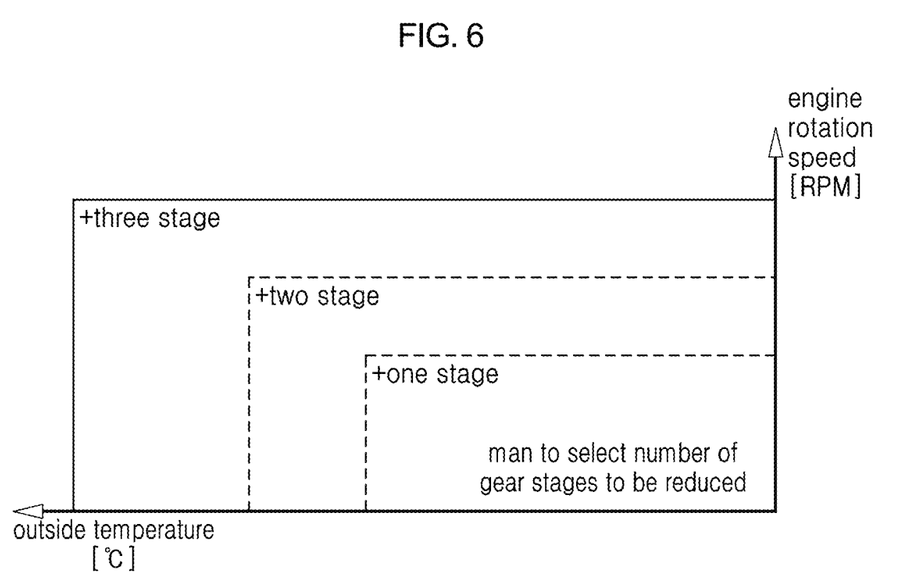
FIG. 6 is a map in which the number of gear stages to be reduced may be selected in the gear stage number-calculation step, in which an outdoor temperature value is set to an X axis and an engine rotation speed value is set to a Y axis.
Figure 8:
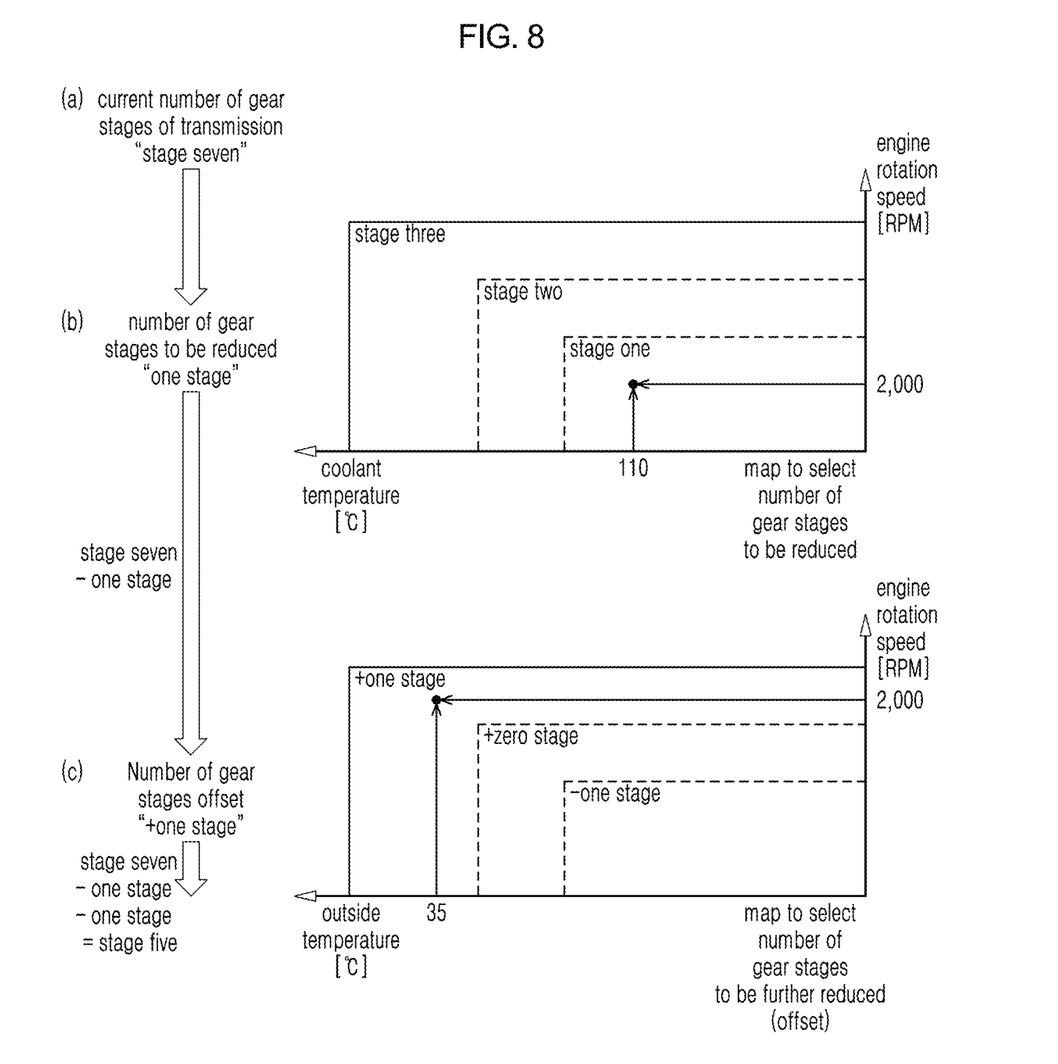
FIG. 8 is a graph showing a process of calculating the number of gear stages to be reduced using a method of cooling a high temperature vehicle coolant according to the present embodiment.

In addition, when the outside temperature exceeds a predetermined temperature value, the cooling efficiency of the fan belt may be reduced, so that the number of gear stages to be reduced may be further added using a map shown in FIG. 6. Specifically, the map shown in FIG. 6 is a map in which an outdoor temperature value is set to an X axis and an engine rotation speed value is set to a Y axis. Finally, the number of gear stages to be changed is calculated by adding a value selected through the map shown in FIG. 6 to the number of the gear stages selected through the map shown in FIG. 4. FIG. 8 shows a map according to an embodiment of the present disclosure. Referring to FIG. 8, when the number of gear stages needs to be reduced in a situation where the current number of gear stages is seven, the number of gear stages to be reduced is selected using the map, and finally the number of gear stages to be reduced is calculated using an offset map. Specifically, the number of gear stages to be reduced is selected using the coolant temperature value and the engine rotation speed value ((b) of FIG. 8). Hereinafter, the number of gear stages to be further reduced is selected using the outside temperature value and the engine rotation speed value, and finally the number of gear stages to be reduced is calculated ((c) of FIG. 8).

Figure 9:
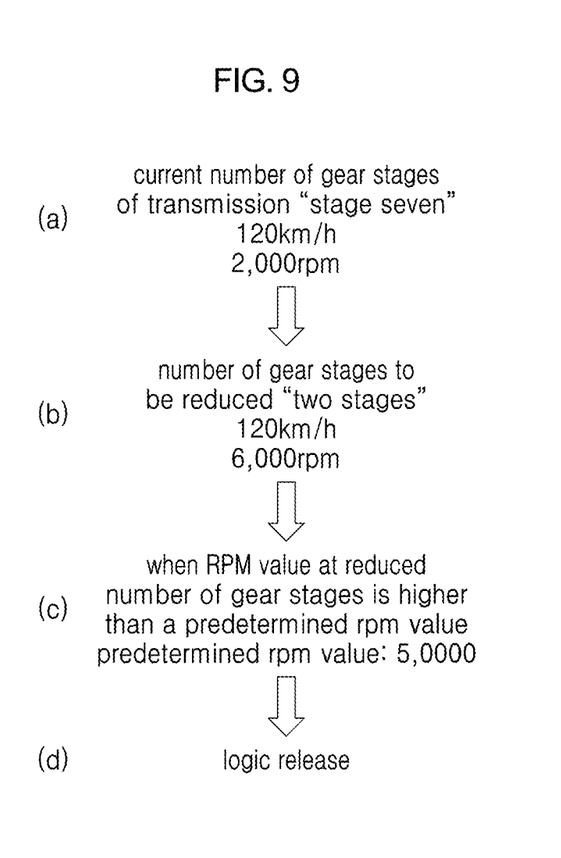
FIG. 9 is a flowchart illustrating a case in which the engine rotation speed exceeds a predetermined RPM value in a process of calculating the number of gear stages to be reduced.

Herein, after the gear stage number changing step S120, when the engine speed exceeds a predetermined critical revolutions per minute (RPM), it is desirable to restore the number of gear stages to a state before the changing. Specifically, as shown in FIG. 9, when an RPM value at the reduced number of gear stages is higher than a predetermined RPM value, the transmission is restored to the original gear stage through a logic release.

Figure 5:
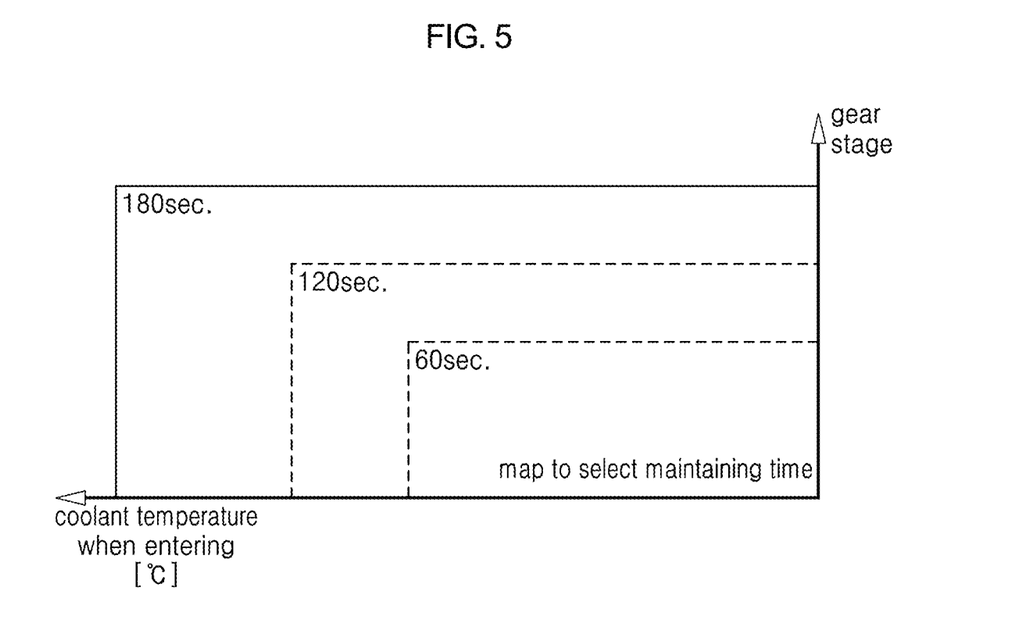
FIG. 5 is a map in which a time to be maintained in the maintenance time calculation step may be selected, in which a coolant temperature value when entering the coolant temperature lowering is set to an X axis and the number of gear stages to be changed is set to a Y axis.

In the maintaining time calculation step S122, an amount of time for which the number of gear stages to be reduced should be maintained may be calculated on the basis of information on the detected coolant temperature and the number of gear stages to be reduced. Herein, in the maintaining time calculation step S122, the time to be maintained may be selected by a predetermined time value in a map in which the coolant temperature value when entering the coolant temperature lowering is set to an X axis and the number of gear stages to be changed is set to a Y axis, as shown in FIG. 5.

In some cases, the method S100 of cooling a high temperature vehicle coolant according to this embodiment may change an air intake amount by adjusting a pitch angle of an air intake blade according to the vehicle speed and vehicle outside temperature by using the intake blade pitch angle variable device 140 of the system 100 for cooling a high temperature vehicle coolant.

Figure 7:
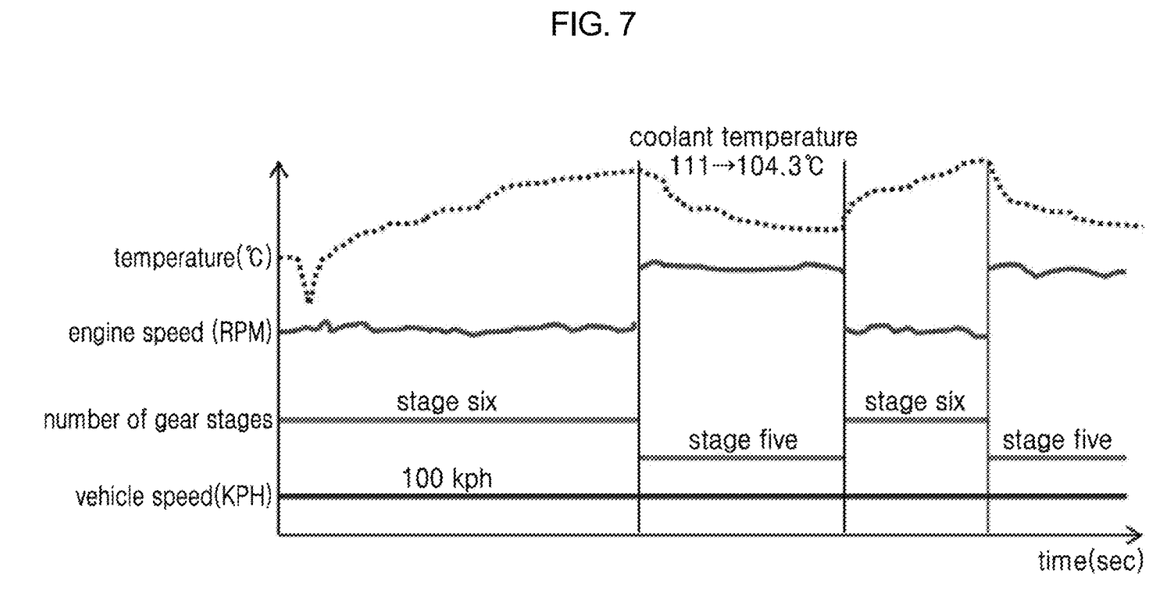
FIG. 7 is a graph showing a general state change of an engine revolutions per minute (RPM) and a general state change of a coolant temperature when the number of gear stages is changed.

FIG. 7 is a graph showing a general state change of an engine revolutions per minute (RPM) and a general state change of a coolant temperature when the number of gear stages is changed.

As shown in FIG. 7, when the number of gear stages of the transmission is adjusted to be reduced to a specific number of gear stages through the gear stage number changing step S120, the engine speed (RPM) increases according to the reducing adjustment of the number of gear stages. Herein, the cooling fan may be driven by driving the fan belt more quickly through the crank damper pulley using the increased engine speed, and as a result, it may be seen that the coolant temperature decreases. Actual measured data shown in the graph shown in FIG. 7 represents general changes in engine revolutions per minute and coolant temperature. When the same aspect as the graph is shown even though it is not the exactly same as the actual measured data in FIG. 7, the technical features of the present disclosure can be applied.

The method S100 of cooling a high temperature vehicle coolant according to the present embodiment includes a gear stage restoring step S130 of restoring the number of gear stages to the state before the change is performed when the temperature of the coolant is less than or equal to a predetermined reference temperature, after the gear number changing step S120 is performed, as shown in FIG. 3.

As mentioned above, in the case of a vehicle according to the related art, when the coolant is maintained at a high temperature, the cooling fan operation and the cluster display are output. However, there is a limit to a control method for cooling efficiency improvement.

According to an embodiment of the present disclosure, since the coolant temperature lowering entry condition determination step, the gear stage number changing step, the reduced stage number calculation step, the maintaining time calculation step, and the gear stage restoring step are included, when the coolant temperature of the vehicle in which the cooling fan is driven using the fan belt exceeds the predetermined temperature value, the coolant temperature can be cooled rapidly, thereby maximizing the cooling efficiency. Accordingly, it is possible to provide a method and system for cooling a coolant, the method and system being configured to be capable of mitigating damage to the engine to secure the operability of the engine and prevent failures, such as thermal deformation, occurring at a high temperature in advance to secure an effective life.

In the above detailed description of the present disclosure, only specific embodiments according thereto have been described. However, it is to be understood that the present disclosure is not limited to the special form mentioned in the detailed description, but to include all modifications, equivalents, and substitutes within the spirit and scope of the present disclosure as defined by the appended claims.

The invention claimed is:

1. A method of rapidly cooling a coolant when a coolant temperature of a vehicle in which a cooling fan is driven using a fan belt exceeds a predetermined temperature value, the method comprising:
    determining a coolant temperature lowering entry condition (S110) by detecting information on the coolant temperature, an engine speed, and a gear state and determining whether the coolant temperature needs to be rapidly lowered on the basis of the detected information; and changing a number of gear stages (S120) by adjusting the number of gear stages of a transmission to be reduced to a specific number of gear stages when the coolant temperature needs to be rapidly lowered in the determining of the coolant temperature lowering entry condition (S110), so that the cooling fan is driven by driving the fan belt through a crank damper pulley using the increased engine speed according to the reducing adjustment of the number of gear stages.

2. The method of claim 1, wherein in the determining of the coolant temperature lowering entry condition (S110), when the detected coolant temperature is higher than a predetermined temperature, the engine speed is higher than a predetermined RPM, the gear state is set to a stage D, and the vehicle is driven in a driver pattern that meets a predetermined pattern mode switch-on condition, the coolant temperature lowering entry condition is determined to be met.

3. The method of claim 2, wherein the coolant temperature lowering entry condition determination step (S110) is performed by detecting a vehicle outside temperature and determining that the coolant temperature lowering entry condition is met only when the vehicle outside temperature is higher than a predetermined temperature.

4. The method of claim 1, wherein the changing of the number of gear stages (S120) comprises calculating a number of gear stages to be reduced from the current number of gear stages on the basis of the detected coolant temperature information and engine speed information (S121).

5. The method of claim 4, wherein the number of gear stages to be reduced in the calculating of the number of gear stages to be reduced (S121) is selected by a predetermined number of gear stages in a map in which the coolant temperature value is set to an X axis and the engine rotation speed value is set to a Y axis.

6. The method of claim 5, after the changing of the number of gear stages (S120), further comprising:
restoring the number of gear stages to a state before the changing when the engine speed exceeds a predetermined critical revolutions per minute (RPM).

7. The method of claim 4, wherein the changing of the number of gear stages (S120) comprises:
calculating a time to be maintained in a state of the number of gear stage to be reduced, on the basis of the detected coolant temperature information and information on the number of gear stages to be reduced (S122).

8. The method of claim 7, wherein the time to be maintained in the calculating of the time to be maintained (S122) is selected by a predetermined time value in a map in which a coolant temperature value when entering coolant temperature lowering is set to an X axis and the number of gear stages to be changed is set to a Y axis.

9. The method of claim 4, wherein the number of gear stages to be reduced in the calculating the number of gear stages to be reduced (S121) is selected by a predetermined number of gear stages in a map where an outdoor temperature value is set to an X axis and an engine speed value is set to a Y axis.

10. The method of claim 1, after the changing of the number of gear stages (S120), further comprising:
restoring the number of gear stages to a state before the changing (S130), when the coolant temperature is equal to or less than a predetermined reference temperature.

11. The method of claim 1, after the changing of the number of gear stages (S120), further comprising:
restoring the number of gear stages to a state before the changing, when the engine speed exceeds a predetermined critical revolutions per minute (RPM).

12. The method of claim 1, wherein an air intake amount is changed by adjusting a pitch angle of an air intake blade according to a vehicle speed and a vehicle outside temperature.

* * * * *